(12) United States Patent
Müller

(10) Patent No.: US 7,668,543 B2
(45) Date of Patent: Feb. 23, 2010

(54) TREATMENT OF A LOCATION REQUEST BY A FIRST LOCATION REQUEST TREATMENT DEVICE (A GATEWAY MOBILE LOCATION CENTRE) IN A HOME REGISTER (HLR) FOR RETRANSMISSION TO A SECOND LOCATION REQUEST TREATMENT DEVICE

(75) Inventor: Wilhelm Müller, Wörth (DE)

(73) Assignee: Nokia Siemens GmbH & Co. KG, Munich (DE)

( * ) Notice: Subject to any disclaimer, the term of this patent is extended or adjusted under 35 U.S.C. 154(b) by 297 days.

(21) Appl. No.: 10/524,267

(22) PCT Filed: Aug. 14, 2002

(86) PCT No.: PCT/EP02/09103

§ 371 (c)(1),
(2), (4) Date: Feb. 6, 2006

(87) PCT Pub. No.: WO2004/021726

PCT Pub. Date: Mar. 11, 2004

(65) Prior Publication Data

US 2007/0032243 A1   Feb. 8, 2007

(51) Int. Cl.
    H04W 4/00   (2006.01)
(52) U.S. Cl. .............. 455/433; 455/456.1; 455/456.2; 455/456.3; 455/456.4
(58) Field of Classification Search ... 455/456.1–456.6, 455/457, 402, 404, 433, 404.2
See application file for complete search history.

(56) References Cited

U.S. PATENT DOCUMENTS

| | | | |
|---|---|---|---|
| 6,104,931 A | 8/2000 | Havinis et al. | |
| 6,104,932 A * | 8/2000 | Havinis ................ | 455/456.5 |
| 6,134,447 A | 10/2000 | Havinis et al. | |
| 2002/0086682 A1 | 7/2002 | Naghian | |

FOREIGN PATENT DOCUMENTS

WO   WO 02/054812 A1   7/2002

OTHER PUBLICATIONS

3GPP TS 23.271 V6.0.0 (Jun. 2002); 3rd Generation Partnership Project; Technical Specification Group Services and System Aspects; Functional stage 2 description of LCS (Release 6); Fig. 6.1-2.*

* cited by examiner

Primary Examiner—Vincent P Harper
Assistant Examiner—Dung Lam
(74) Attorney, Agent, or Firm—Laurence A. Greenberg; Werner H. Stemer; Ralph E. Locher

(57) ABSTRACT

The invention relates to the efficient treatment of location requests by a home register and GMLCs of various versions by means of a method for treating a location request relating to a subscriber in a mobile radio network. Once a request (SRI) from a first location request treatment device (GMLC-R5) arrives in a subscriber data bank (HLR) in a mobile radio network, relating to switching device address data (MAP (MSC/SGSN)) in a switching device (MSC/SGSN) or location request treatment device (V-GMLC), enabling (MSC/SGSN/V-GMLC) a subscriber (MS) to be currently reached, the subscriber data bank (HLR) indicates the address (MAP (H-GMLC) of another location request treatment device (H-GMLC-R6) instead of a switching device address (MAP (MSC/SGSN)) in an answer (Ack (MSC(SGSN)) if the request is a request from a version (R5) of a location request treatment device wherein said version (R5) includes provision such that the location request treatment device (GMLC-R5) receives switching device data (MAP(MSC/SGSN) from the subscriber data base (HLR) as an answer.

11 Claims, 3 Drawing Sheets

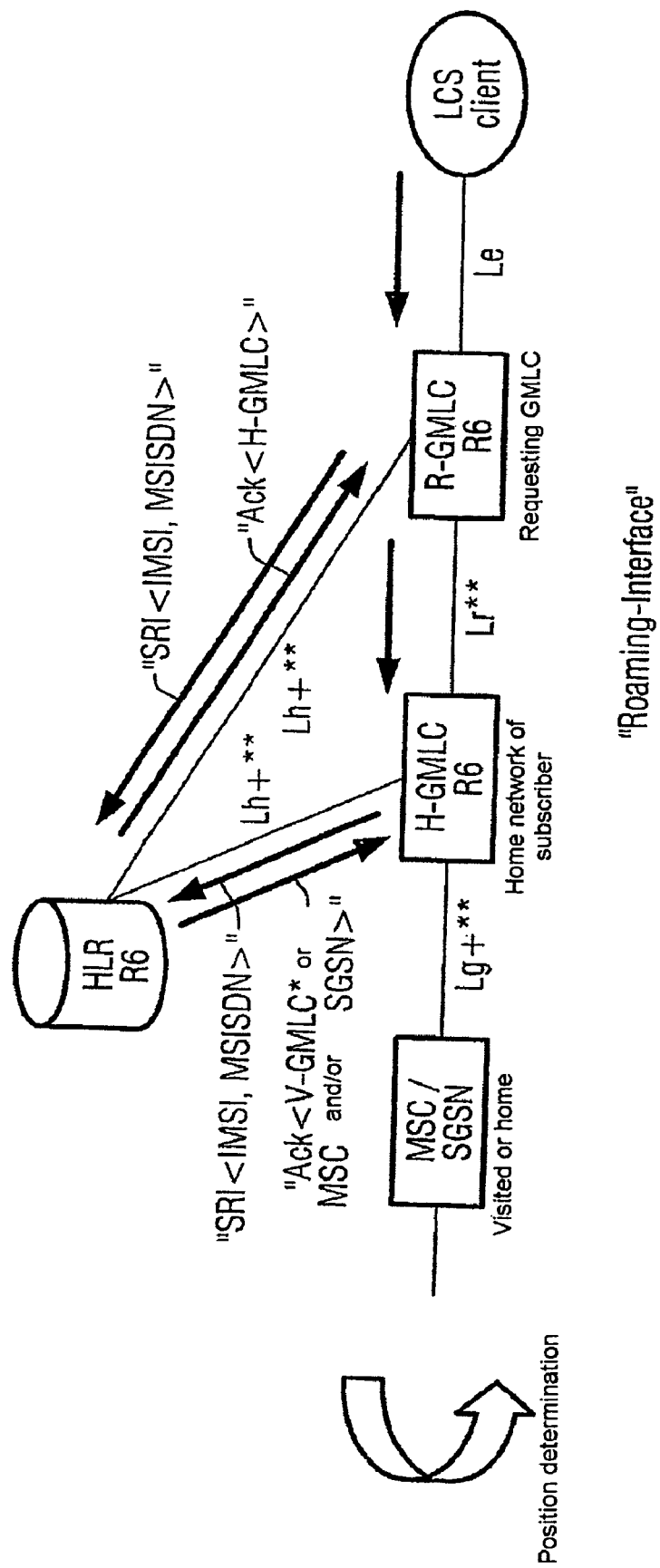

TREATMENT OF A LOCATION REQUEST BY A FIRST LOCATION REQUEST TREATMENT DEVICE (A GATEWAY MOBILE LOCATION CENTRE) IN A HOME REGISTER (HLR) FOR RETRANSMISSION TO A SECOND LOCATION REQUEST TREATMENT DEVICE

This application is a national stage of PCT/EP2002/009103, published in the German language on Mar. 11, 2004, which was filed in the english language on Aug. 14, 2002.

TECHNICAL FIELD OF THE INVENTION

The invention relates to a method and devices for handling a request relating to an address of a switching device, via which a subscriber in a mobile radio network can currently be reached.

BACKGROUND OF THE INVENTION

U.S. Pat. No. 6,104,932 discloses a mobile radio network, in which further to a request from a GMLC (gateway mobile location center) a home location register HLR notifies the GMLC of an address of the MSC/VLR, in the service area of which a mobile station MS is located.

It is known from the document 3GPP 23.271 that in response to a location request (request for location-related data, e.g. the location of the mobile radio subscriber) from an LCS client (location services client) to a GMLC (gateway mobile location center) relating to the switching device MSC/SGSN, via which a subscriber in a mobile radio network can currently be reached, the GMLC requests the address of a switching device currently responsible for a subscriber from a home location register (HLR). A GMLC-R5 (version "R5" GMLC or even older version) sends an SRI request (SRI=send routing information, such as for example a MAP destination address, etc.) to a subscriber database (HLR-R4/R5) of the mobile radio network for the address of a switching device (MSC, SGSN, etc. of a subscriber database (VLR) there), via which a subscriber (MS) (characterized by an MSISDN or IMSI, etc.) can currently be reached, whereupon the home location register (HLR/R4/R5) sends back in a response (Ack(SGSN)/Ack/MSC)) data representing the (MAP/ISDN/etc.) address of a switching device (MSC/SGSN) to the location request device (GMLC-R5), which then sends data relating to the location request via an Lg interface to the switching device (MSC/SGSN) specified to it by the HLR for further handling there (determination of position of current MS position and/or other services) (FIG. 2).

The development of a home GMLC would make it possible (FIG. 3) to transmit the address data of a switching device (MSC/SGSN) or an H-GMLC in the home network of a subscriber in response to a request from a first GMLC (R-GMLC) to a home data base, with the option of being able to verify and take into account privacy data stored there in the H-GMLC relating to privacy functions, etc. The data is transmitted from the H-GMLC (in so far as this is expedient based on the privacy data of the subscriber) for example to a switching device (MSC/SGSN) in the network visited by the subscriber or a home network for further handling. With this variation, however, the problem would arise that an older version GMLC (e.g. GMLR-R5) and HLR would not be able to process details of the further GMLC (H-GMLC R6) handling the location request further according to FIG. 3.

SUMMARY OF THE INVENTION

The present invention allows for efficient handling of a location request with newer version home registers (e.g. HLR R6) even with an older version GMLC (GMLC-R5).

According to one embodiment of the invention, when a request from an older version (release 5) location request handling device (GMLC-R5) is received in a newer version home register (HLR-R6), a response (Ack(MSC and/or SGSN)) is transmitted to the location request handling device (GMLC-R5) in a form which the GMLC-R5 understands such that the address data of a switching device (MSC/SGSN) is specified to it, which it (GMLC-R5) according to FIG. 2 should contact for the further handling of a location request, the GMLC R5 generally contacts the element that can be reached at the address specified in the response of the HLR, which here is not however the MSC/SGSN (as usual) but according to FIG. 1 a newer version location request handling device (H-GMLC R6), which after receiving further data (Ack . . . and in some instances privacy data) from the HLR R6 contacts a switching device (MSC/SGSN/V-GMLC) in FIG. 1 and prompts the further handling of the location request there. The home database (HLR-R6) in FIG. 1 thus sends, in the format of a message, which in the standard manner specifies to an older version location request handling device (GMLC-R5) the switching device address data of an MSC/SGSN (Ack (SGSN and/or MSC) (according to FIG. 2), the address of the H-GMLC-R6 in the address field of the message Ack (. . .), which prompts the location request handling device (GMLC R5) to contact the further location request handling device (H-GMLC R6) specified. It is thereby not evident to the former location request handling device (GMLC R5) that it is actually contacting (according to FIG. 2) not a switching device MSC/SGSN but a further location request handling device H-GMLC-R6 according to FIG. 1, which (in some instances after taking into account the privacy profile data of the HLR R6) in turn contacts the switching device MSC/SGSN at the switching device address, which the H-GMLC-R6 receives in the message Ack (V-GMLC or MSC or SGSN) from the HLR R6.

It is for example advantageous if, when handling a location request in a home GMLC (H-GMLC R6) stored profile data relating to the subscriber in relation to whom a location request is to be executed, can be taken into account. In particular, this may be privacy profile data, which is stored in relation to a terminal or subscriber or a subscriber identity card and specifies whether and under what conditions a position determination operation can be processed and/or responded to in relation to the subscriber.

BRIEF DESCRIPTION OF THE DRAWINGS

Further features and advantages of the invention will emerge from the description which follows of the prior art and an exemplary embodiment with reference to the drawing, in which:

FIG. 3 shows the handling of a location request with a newer version HLR-R6 and R-GMLC R6.

DETAILED DESCRIPTION OF THE INVENTION

Figure 2:
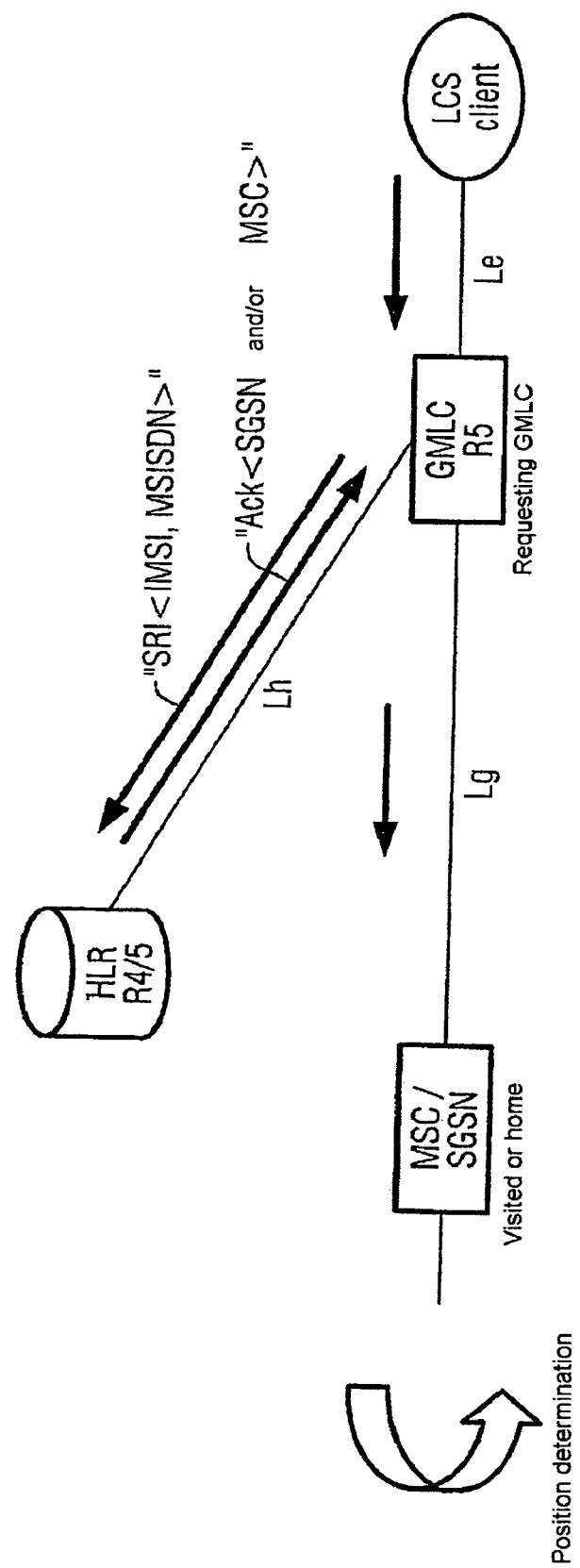
FIG. 2 shows the handling according to the prior art of a location request with an older version GMLC-R5.

The handling of a location request already described above according to FIG. 2 is suitable for current standard versions (product versions) of location request handling devices GMLC and subscriber databases (HLR-R5). As described in more detail at the start, possible processing of a location request according to FIG. 3 would be problematic, if there were a GMLC-R5 instead of the R-GMLC-R6 shown in FIG. 3, as this cannot interpret and process data "Ack(H-GMLC)", as shown in FIG. 3, of a further location request handling device H-GMLC-R6.

Figure 1:
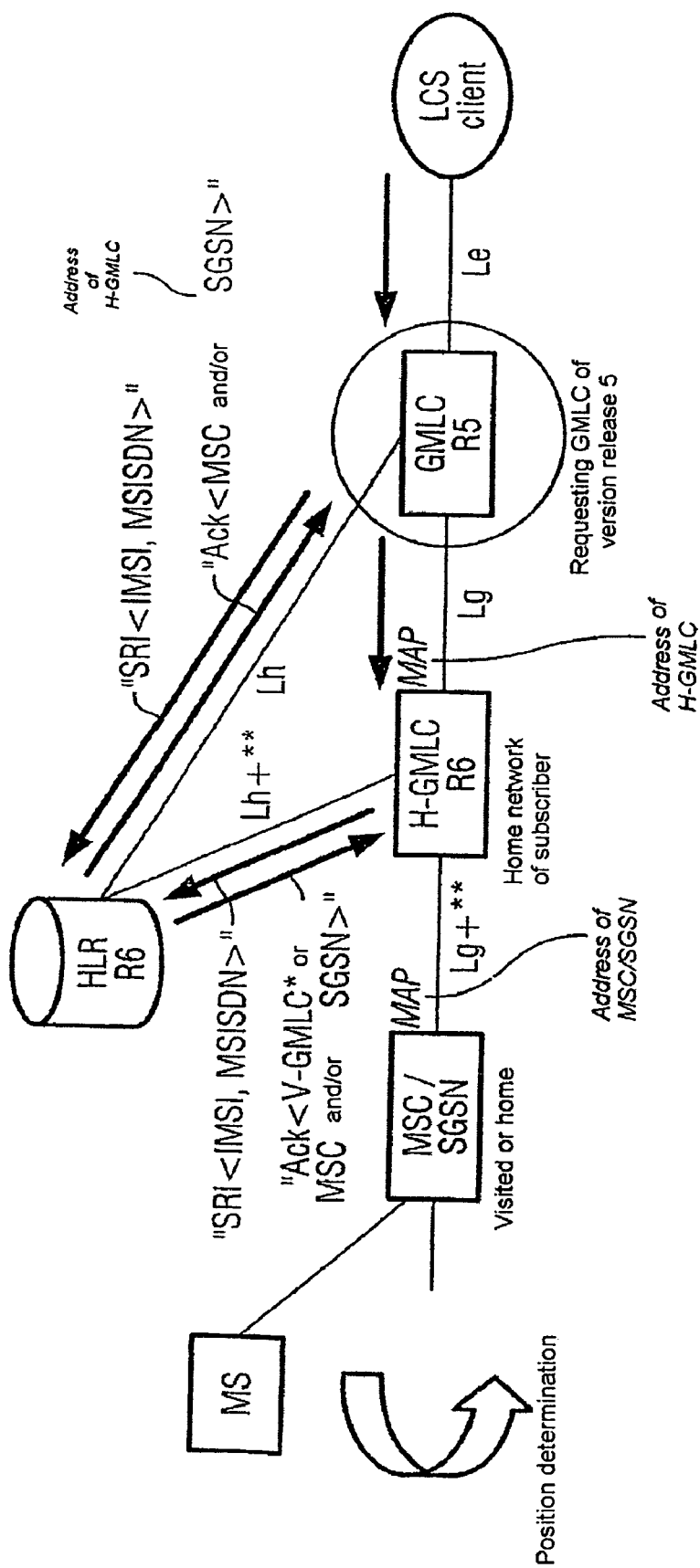
FIG. 1 shows interaction according to the invention of components of a mobile radio network for handling a location request with elements of older and newer versions.

According to FIG. 1, a new version home register HLR R6, when it receives a request from a former (older) version location request handling device GMLC-R5, which is awaiting details (Ack-H-GMLC) of address data relating to an address of a switching device (MSC/SGSN etc.) as a response by the subscriber database (HLR) to the request, specifies to the former older version location request handling device GMLC-R5 the address of a further location request handling device (H-GMLC-R6) in a data field, in which the address of the switching device would otherwise be specified. A format is thereby used in the details of the location request handling device address of the further location request handling device H-GMLC, in which the first location request handling device GMLC-R5 awaits the details (Ack-H-GMLC) of an address of a switching device (MSC/SGSN etc.).

The GMLC-R5 interprets the address of the switching device (MSC and/or SGSN) specified in this address field (provided for a GMLC address) to the effect that it (GMLC-R5) should contact the switching device specified by this address for further handling of the location request. However, according to FIG. 1 it thereby contacts the further location request handling device H-GMLC-R6, which (in the manner provided conventionally for it) uses the data thus transmitted to it according to FIG. 2 and the data transmitted to it from the HLR-R6 to handle the location request further, by contacting the switching device MSC/SGSN specified to it, in some instances via an Lg+** interface in FIG. 1.

In this way, according to the invention, older version location request handling devices GMLC-R5 can be operated efficiently with newer version home subscriber databases HLR-R6 and further location request handling devices (new version H-GMLC-R6). It is thereby possible in some instances to take into account profile data, in particular privacy profile data, relating to the subscriber and stored in a new version location request handling device (H-GMLC-R6). Such privacy data can, in particular, specify whether location requests can be handled and/or responded to for a subscriber in principle, or as a function of the subscriber's location or as a function of the caller or as a function of other conditions or in another manner. It is thus also possible in conjunction with an older version GMLC-R5.

This process can, for example, also operate in response to a request from a subscriber in a cellular mobile radio network, to whom data is transmitted representing the position of a further subscriber in a cellular mobile radio network (in some instances to the extent permitted by the profile data of the further subscriber). The request is then sent, for example, from the requesting subscriber in particular via an air interface and switching devices to the LCS client shown in FIG. 1 and from there according to FIG. 1, whereupon data representing the position of a further subscriber in a cellular mobile radio network can be transmitted (e.g. by SMS, MMS, card, etc.) to the requesting subscriber.

The switching device (MSC/SGSN/V-GMLC), via which (MSC/SGSN/V-GMLC) a subscriber (MS) can currently be reached, can be a switching device such as an MSC/SGSN, via which the subscriber has just telecommunicated or in the visitor location register (VLR) of which data about the subscriber is stored, or another device (V-GMLC) via which a subscriber can communicate directly or via other devices.

There are a plurality of options for the format of address data, in particular the MAP format (a MAP address is for example a network node number in ISDN format for MSC, SGSN, GMLC). For an interworking scenario, MAP address format is also suitable at the Lg and Lh interface (and in some instances also at Lg+ and Lh+ in Rel-6). An IP address format for address data is for example possible on the Lr interface.

What is claimed is:

1. A method for handling a location data request or location request relating to a subscriber in a mobile radio network, comprising:

receiving a request from a first location request handling device at a subscriber database of a mobile radio network, for switching device address data of a switching device, via which the subscriber can currently be reached, the subscriber database being capable of receiving requests from a first version of a location request handling device for which there is provision to receive switching device address data from the subscriber database as a response and from a second version of a location request handling device for which there is provision to receive location request handling device address data representing an address of a further location request handling device; and determining whether the request is from a location request handling device of the first version or of the second version, wherein in the event that the request is from a location request handling device of the first version, specifying, via the subscriber database, to the first location request handling device, in a response, location request handling device address data representing an address of a further location request handling device instead of the switching device address data.

2. The method according to claim 1, wherein the further location request handling device is a location request handling device in a home network of the subscriber.

3. The method according to claim 1, wherein the further location request handling device stores profile data of the subscriber, which specifies whether and under what conditions the location request relating to the subscriber should be processed and/or responded to.

4. The method according to claim 1, wherein a first older version location request handling device sends the request to the subscriber database after receiving a request from an LCS client.

5. The method according to claim 1, wherein the first location request handling device sends the location request to the address of the further location request handling device, which it is forwarded to the address of a switching device, which was specified thereto by the subscriber database in response to a request to the subscriber database.

6. The method according to claim 4, wherein the request includes data of the subscriber to be located identifying the subscriber.

7. The method according to claim 1, wherein the location request handling device address data has a same format as switching device address data.

8. The method according to claim 1, wherein the version of the location request handling device is identified by the subscriber database from the non-extended format of the request.

9. The method according to claim 1, wherein the version of the location request handling device is identified from a Lh interface used.

10. The method according to claim 1, wherein the further location request handling device profile data of the subscriber, in respect of whom a location request is to be implemented, is verified and the further location request handling device contacts the switching device specified to it, if the profile data of the subscriber shows that the location request relating to the subscriber should be carried out.

11. A device for handling a location data request or location request relating to a subscriber in a mobile radio network, comprising:

a register of subscriber location information capable of receiving a request from a first location request handling device for switching device address data of a switching device, via which the subscriber can be reached, the register of subscriber location information being capable of receiving requests from a first version of a location request handling device for which there is provision to receive switching device address data from the subscriber database as a response and from a second version of a location request handling device for which there is provision to receive location request handling device address data representing an address of a further location request handling device;

wherein the register of subscriber location information is capable of determining whether the request is from a location request handling device of the first version or of the second version, and in the event that the request is from a location request handling device of the first version, the register of subscriber location information is capable of specifying, via the register of subscriber location information, to the first location request handling device, in a response, location request handling device address data representing an address of a further location request handling device instead of the switching device address data.

* * * * *